United States Patent
Tredoux

(10) Patent No.: US 8,423,628 B2
(45) Date of Patent: Apr. 16, 2013

(54) METHOD AND APPARATUS FOR EXTENDING FUNCTIONALITY OF NETWORKED DEVICES

(75) Inventor: Gavan Tredoux, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 838 days.

(21) Appl. No.: 12/145,591

(22) Filed: Jun. 25, 2008

(65) Prior Publication Data

US 2009/0327456 A1   Dec. 31, 2009

(51) Int. Cl.
*G06F 15/173* (2006.01)

(52) U.S. Cl.
USPC ............ 709/221; 713/176; 382/100; 709/223; 358/448

(58) Field of Classification Search .................... 709/221
See application file for complete search history.

(56) References Cited

U.S. PATENT DOCUMENTS

| | | | | |
|---|---|---|---|---|
| 6,925,538 | B2* | 8/2005 | Niwa et al. | 711/154 |
| 7,243,225 | B2* | 7/2007 | Poeluev et al. | 713/151 |
| 7,284,246 | B2* | 10/2007 | Kemp et al. | 719/321 |
| 7,581,229 | B2* | 8/2009 | Watkins et al. | 719/321 |
| 7,600,050 | B2* | 10/2009 | Aritomi | 710/5 |
| 7,802,306 | B1* | 9/2010 | Adams et al. | 726/26 |
| 2003/0005100 | A1* | 1/2003 | Barnard et al. | 709/223 |
| 2003/0061489 | A1* | 3/2003 | Pelly et al. | 713/176 |
| 2004/0025165 | A1* | 2/2004 | Desoli et al. | 719/310 |
| 2004/0145601 | A1* | 7/2004 | Brielmann et al. | 345/708 |
| 2004/0179103 | A1* | 9/2004 | Endo et al. | 348/207.2 |
| 2005/0185211 | A1* | 8/2005 | Foehr et al. | 358/1.15 |
| 2005/0270587 | A1* | 12/2005 | Yamakawa et al. | 358/448 |
| 2006/0031327 | A1* | 2/2006 | Kredo | 709/206 |
| 2006/0059340 | A1* | 3/2006 | Eldenmalm et al. | 713/168 |
| 2007/0033408 | A1* | 2/2007 | Morten | 713/176 |
| 2008/0276297 | A1* | 11/2008 | Shay | 726/1 |
| 2009/0225349 | A1* | 9/2009 | Hirai | 358/1.15 |

* cited by examiner

*Primary Examiner* — Ashok Patel
*Assistant Examiner* — Andrew Goldberg
(74) *Attorney, Agent, or Firm* — Ronald E. Prass, Jr.; Prass LLP

(57) ABSTRACT

Disclosed are methods for providing extended functionality to a networked device, the networked device connected in a network, as well as corresponding apparatus and computer-readable medium. The embodiments intercept data communications in which the networked device is a party, the data communications being intercepted by an interdictor, receive at the interdictor a subscription registration for notification of a networked device event which is to be altered, the subscription registration being received from an extension service, determine whether the data communications in which the networked device is a party corresponds to the subscription registration of the networked device event which is to be altered, and modify the data communications in which the networked device is a party to provide the extended functionality when the data communications are determined to correspond to the subscription registration of networked device event to be altered.

18 Claims, 3 Drawing Sheets

METHOD AND APPARATUS FOR EXTENDING FUNCTIONALITY OF NETWORKED DEVICES

BACKGROUND

Disclosed are methods for extending functionality of a networked device, as well as corresponding apparatus and computer-readable medium.

A device connected in a network can provide a user with desired functionality. For example, printers, scanners, facsimile devices, and the like can provide a computer user with the added functionality these devices provide. Some of these networked devices provide multiple functions, such as devices that provide the ability to print, copy, facsimile, and the like from a single device, and may be known as a multifunction device (MFD).

In order for a networked device to interface with and function with a computer or electronic device to which it is connected, a device driver can be installed on the computer. A device driver, such as a printer driver, is software which controls the networked device from the computer. The device driver may include a user interface, which may be typically accessed by a user through an operating system or an application program, such as a word processing program, a spreadsheet program, or other types of programs, and viewed on a display on the computer. Certain functionality is provided by the device driver, typically through the user interface.

However, it is very difficult for a user or administrator to extend the functionality of the networked device to include features not provided by the driver or the device itself. Altering the driver software or other controller software to provide added functionality is a complex process beyond the capabilities of most users. Accordingly, it would be beneficial if functionality of the networked device could be extended without altering the driver or controller software associated with the multi-function device.

SUMMARY

According to aspects of the embodiments, there is provided methods for providing extended functionality to a networked device, the networked device connected in a network, as well as corresponding apparatus and computer-readable medium. The embodiments intercept data communications in which the networked device is a party, the data communications being intercepted by an interdictor, receive at the interdictor a subscription registration for notification of a networked device event which is to be altered, the subscription registration being received from an extension service, determine whether the data communications in which the networked device is a party corresponds to the subscription registration of the networked device event which is to be altered, and modify the data communications in which the networked device is a party to provide the extended functionality when the data communications are determined to correspond to the subscription registration of networked device event to be altered.

DETAILED DESCRIPTION

Figure 1:
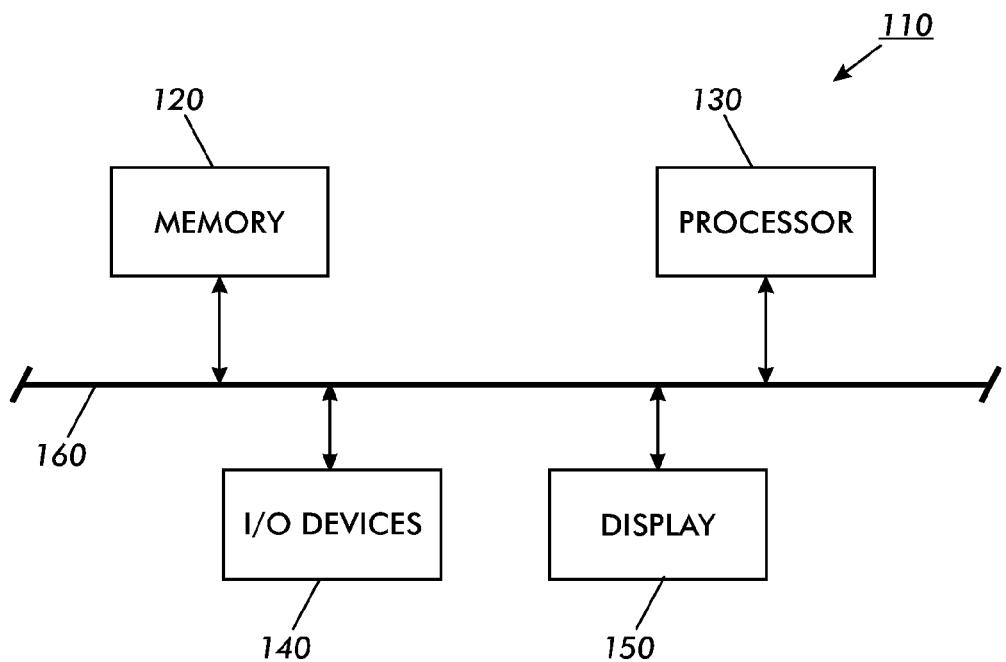
FIG. 1 illustrates a block diagram of an apparatus.

Aspects of the embodiments relate to methods for extending functionality of a networked device, as well as corresponding apparatus and computer-readable medium.

The embodiments include a method of providing extended functionality to a networked device, the networked device connected in a network. The method includes intercepting data communications between the networked device and the client device with an interdictor, receive at the interdictor a subscription registration for notification of a networked device event which is to be altered, the subscription registration being received from an extension service, determining whether the data communications in which the networked device is a party corresponds to the subscription registration of the networked device event which is to be altered, and modifying the data communications in which the networked device is a party to provide the extended functionality when the data communications are determined to correspond to the subscription registration of networked device event to be altered.

The embodiments further include an interdictor for connection in a network to a networked device, and for connection to an extension service, the interdictor providing extended functionality to the networked device. The interdictor may include a memory that stores instructions, and a controller connected to the memory, wherein the controller, based on the stored instructions, causes the interdictor to intercept communications in which the networked device is a party, receive a subscription registration for notification of a networked device event which is to be altered, the subscription registration being received from an extension service, determine whether the data communications in which the networked device is a party corresponds to the subscription registration of the networked device event which is to be altered, and modify the data communications in which the networked device is a party to provide the extended functionality when the data communications are determined to correspond to the subscription registration of networked device event to be altered.

The embodiments further include a computer-readable medium, including a computer-usable data carrier storing instructions, the instructions when executed by a controller causing the controller to: intercept data communications in which a networked device connected in a network is a party, the data communications being intercepted by an interdictor, receive a subscription registration for notification of a networked device event which is to be altered, the subscription registration being received from an extension service, and modify the data communications in which the networked device is a party to provide the extended functionality when the data communications in which the networked device is a party are determined to correspond to the subscription registration of a networked device event to be altered.

As used herein, a networked device is a device that is connected in a network typically to one or more computer users to provide certain functionality to the computer users. Examples of networked devices are a printer, a scanner, a copier, a facsimile device, a device combining the functionality of any of these devices (often referred to as a multifunction device (MFD)), and the like.

FIG. 1 illustrates a diagram of a system or apparatus 110. The system 110 may be embodied within devices such as a desktop computer, a laptop computer, a handheld computer, a handheld communication device, or another type of computing or electronic device, or the like. The system 110 may include a memory 120, a processor 130, input/output devices 140, a display 150 and a bus 160. The bus 160 may permit communication and transfer of signals among the components of the computing device 110. The display 150 and input/output devices 140 may not be needed in certain embodiments.

Processor 130 may include at least one conventional processor or microprocessor that interprets and executes instructions. The processor 130 may be a general purpose processor or a special purpose integrated circuit, such as an ASIC, and may include more than one processor section. Additionally, the system 110 may include a plurality of processors 130.

Memory 120 may be a random access memory (RAM) or another type of dynamic storage device that stores information and instructions for execution by processor 130. Memory 120 may also include a read-only memory (ROM) which may include a conventional ROM device or another type of static storage device that stores static information and instructions for processor 130. The memory 120 may be any memory device that stores data for use by system 110.

Input/output devices 140 (I/O devices) may include one or more conventional input mechanisms that permit a user to input information to the system 110, such as a microphone, touchpad, keypad, keyboard, mouse, pen, stylus, voice recognition device, buttons, and the like, and output mechanisms such as one or more conventional mechanisms that output information to the user, including a display, one or more speakers, a storage medium, such as a memory, magnetic or optical disk, disk drive, a printer device, and the like, and/or interfaces for the above. The display 150 may typically be an LCD or CRT display as used on many conventional computing devices, or any other type of display device.

The system 110 may perform functions in response to processor 130 by executing sequences of instructions or instruction sets contained in a computer-readable medium, such as, for example, memory 120. Such instructions may be read into memory 120 from another computer-readable medium, such as a storage device, or from a separate device via a communication interface, or may be downloaded from an external source such as the Internet. The system 110 may be a stand-alone system, such as a personal computer, or may be connected to a network such as an intranet, the Internet, and the like. Other elements may be included with the system 110 as needed.

The memory 120 may store instructions that may be executed by the processor to perform various functions. For example, the memory may store printer driver or other instructions to allow the system to perform various printing functions in association with a particular printer connected to the system. The printer driver instructions are typically unique to each specific type of printer, and the system 110 may store a plurality of print drivers each for a different printer. Instructions for drivers for networked devices other than printers may also be used.

Figure 2:
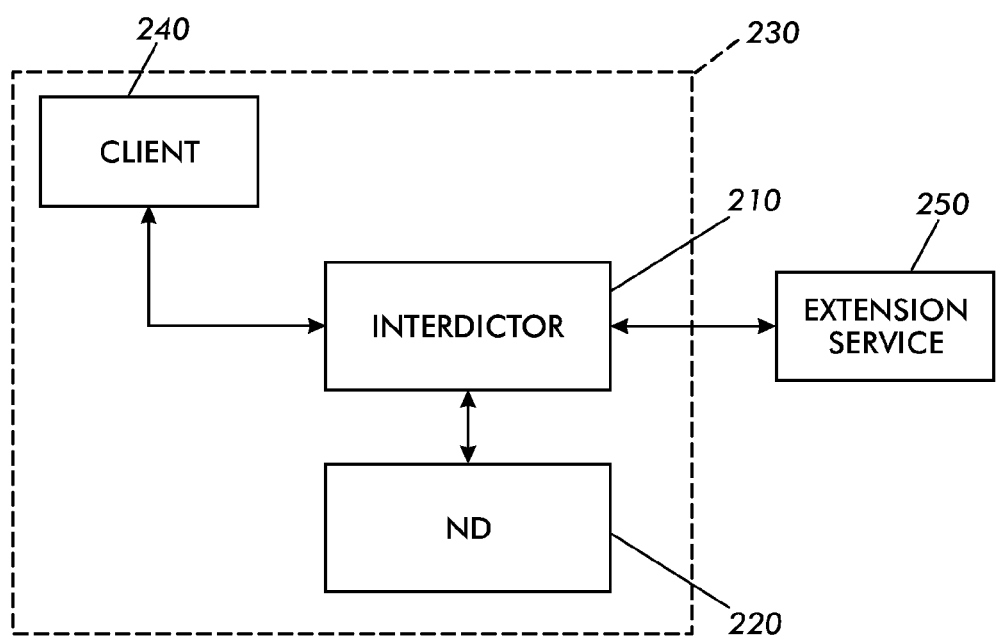
FIG. 2 illustrates a block diagram of a network including an apparatus for providing extended functionality to a networked device.

FIG. 2 illustrates an interdictor 210 as it may be used in conjunction with a networked device (ND) 220. The networked device 220 may be a device connected in a network, such as network 230, which may be connected to one or more computing device or client 240, for example. The networked device 220 may be a printer, a scanner, a copier or another device connected in a network that may be used by one or more network users, and may be a device commonly known as a multi-function device (MFD), which may provide multiple functions to a user connected to the MFD, such as printing, scanning, facsimile, photo printing, and the like. The interdictor 210 typically may include some or all of the elements of system 110, including the memory 120, the processor 130, and bus 160, although the display 150 and I/O devices 140 may not be needed. The interdictor 210 may be embodied on a printed circuit board, may be a device having its own housing, or may be embodied as a program stored in a memory and running on a processor.

The interdictor 210 may be connected between the networked device 220 and a client 240 in the network 230. The client 240 may be a device such as a print spooler or other element that would normally control the networked device 210. The client 240 may be running on a print server, for example. Also, one or more extension service 250 may be connected to the interdictor 210. The extension service 250 may be located remotely from the interdictor 210, such as across an Internet connection, may be located on a local server such as inside network 230, or may be located outside of network 230. In certain situations, a client 240 may not be involved, such as when the networked device 210 is operating as for example a scanner, and the scanned electronic file is stored to a target such as a repository.

The elements of FIG. 2 may be connected together in any conventional manner, such as wired, wireless, and the like. Further, the elements of FIG. 2 may be at different physical locations.

The networked device 220 will provide certain functionality to a user. The functionality may be controlled by a driver program associated with the device. For example, where the networked device 220 is a printer, a print driver may control functionality used for printing in association with a client 240, which may be a print server. The interdictor 210 is placed between the networked device 220 and the client 240 to intercept communications between the networked device 220 and the client 240. Where there is no client 240 or driver used, outgoing network traffic to the target can be interdicted by interdictor 210. The interdictor 210 extends functionality normally provided by the networked device 220 (such as provided by a device controller) and the print driver (when used) by altering data sent between the client 240 and the networked device 220, or other outgoing traffic from the networked device. In this way, the functionality can be extended in a way that may not be visible to the networked device 220 or the client 240 (when used), and does not require any alteration to the networked device 220 or the client 240. For example, a device controller and associated software, or a print driver or other driver, would not need to be altered.

The extension service 250 is connected to the interdictor 210. The extension service 250 may be located outside of network 230, or within the network 230, such as on a LAN or WAN. The interdictor 210 may allow one or more extension services 250 to register with the interdictor 210. The registration may be a subscription registration. The extension services 250 may be external to the network 230 and may connect to the interdictor 210 over another network such as the Internet. A user or administrator of network 230 may be able to choose which extension services 250 to allow registering with interdictor 210, based on a functionality that is desired to be added, for example. The elements in FIG. 2 will generally communicate using a standard set of network protocols, such as TCP/IP, although any network protocol could be used.

Generally, the interdictor 210 will bind to network ports of the networked device 220 and will by default simply forward traffic between the networked device 220 and the client 240.

This may be done in a highly efficient manner. The interdictor 210 could use Network Address Translation (NAT) to forward traffic, for example.

As an example of a type of extended functionality that may be provided, where the networked device 220 is a scanner providing scanning functionality or is an MFD with scanning capability, an administrator or user may decide it would be desirable to watermark every scanned document with a company logo, but the controller for the scanner has no such watermarking functionality. The scanner may not use a driver or client for the scanning functionality, but the interdictor 210 can interdict the scanned file as outgoing network traffic, and through use of the extension service, add the watermark.

This could be put in place by an administrator of a corporate network, for example, and could happen without any control by users on the network. The administrator could find such an extension service 250 on the Internet or otherwise, or could set up the interdictor 210 to allow registration of an extension service to add a watermark to every scanned document. The administrator could input a logo or other item to be used as the watermark using an interface, for example.

As another example of a type of extended functionality that may be provided, where the networked device 220 is a printer providing printing functionality or is an MFD with printing capability, an administrator or user may decide it would be desirable to extend functionality of the printer. For example, one may desire to add microtext to each page printed, to prohibit altogether printing of certain documents or documents with certain content, or to add other extended functionality. Where the printer is run by a driver and connected to a client such as a print spooler, the interdictor is placed between the printer and client 240 to intercept communications and add the desired functionality through the use of the extension service 250.

Thus, the interdictor 210 and extension service 250 may be used to extend functionality when the networked device 220 is used with a client 240 and a driver, or when no client or driver is used. In both cases, the interdictor 210 intercepts network communications to and from the networked device 220 to add the extended functionality.

Where extension services 250 are allowed to register themselves with the interdictor 210 using a subscription registration, the interdictor 210 can determine when an event such as a scan, print or other event occurs relating to the subscription registration and inform the extension service of such. The event notification may be synchronous or asynchronous. The interdictor 210 thus acts as a means for adding external services to the functionality of the networked device 220 by altering communications between the client 240 and the networked device 220, or by altering communications to and from the networked device 220 where no client 240 is used.

An event registration by the extension service 250 at the interdictor may include various information such as a port number (or service name), a synchronous or asynchronous flag, how many bytes from a network stream or packet to include in the notification, an address (URL) to send the event notification to, a date and time when the event notification expires, and the service the notification pertains to. It may be up to either the interdictor 210 or the extension service 250 to control the operations that are to be altered.

The interdictor 210 is programmed to allow subscription registration of extension services 250 that will provide extended functionality. Typically, either a user of a computer attached to the network 230, or an administrator of the network 230, will select services to be added, and corresponding extension services 250 will be selected to provide extended functionality. The extension service 250 then may register an event registration with the interdictor 210, which will indicate a type of event for which extended functionality is to be provided for by the corresponding extension service 250. For example, if an extension service 250 is to provide an extended functionality to all scanned images on a networked device 220 such as a scanner, when data is received at the interdictor 210 from the networked device 220 indicating a scanned image, the interdictor 210 can notify the corresponding extension service 250 by sending an event notification.

When a request (incoming), response (outgoing) or packet is received on a network port, the interdictor 210 may notify all extension services 250 that have matching event registrations. If more than one extension service 250 matches, the interdictor 210 will notify all matching extension services 250 by sending event notifications. The event notification will typically include a header of data from the request, response or packet.

In response, the extension service 250 provides one of several replies. The extension service 250 can request more data to make a decision. A request for more data may be repeated as required. The interdictor 210 can respond by sending the requested data or indicating that no more data is available.

Where a client 240 is used, the response from the extension service 250 to the interdictor may contain data to be sent by the interdictor 210 to the client 240, when the client would be expecting a response from the networked device 220. The extension service 250 can in effect preempt the response to a request, e.g., to cancel a print or scan job without notifying the networked device 220. This may happen when the client 240 is expecting a response.

The extension service 250 may also instruct the interdictor 210 to simply ignore a request from the networked device 220. The extension service 250 can respond by indicating no interest and that it wants no further information about the connection or exchange of data.

When appropriate, the extension service 250 may need to replace some of the data sent to it in an event notification by the interdictor 210, or to add to the data. The response from the extension service 250 may instruct the interdictor 210 to replace or add to the data communications between the networked device 220 and the client 240, and may supply the data, which may be extended functionality data. In this way, the interdictor 210 does not have to analyze the data from the networked device 220 or from the client 240, but instead will merely modify the data as instructed. The interdictor 210 replaces or adds to the data and forwards it as needed, together with the remaining data. For example, the extension service 250 may instruct the interdictor 210 to add data that will result in the watermark or other extended functionality being added.

The interdictor 210 may also forward all of the data to the extension service 250, where it can be modified as needed, sent back to the interdictor 210, and forwarded by the interdictor 210 to either the client 240 or to the networked device 220.

The interdictor 210 may use port forwarding to forward traffic sent to the networked device 220, and use Networked Address Translation (NAT) to forward data sent by the networked device. This requires no alteration to the networked device 220, and is thus manufacturer and model independent.

Figure 3:
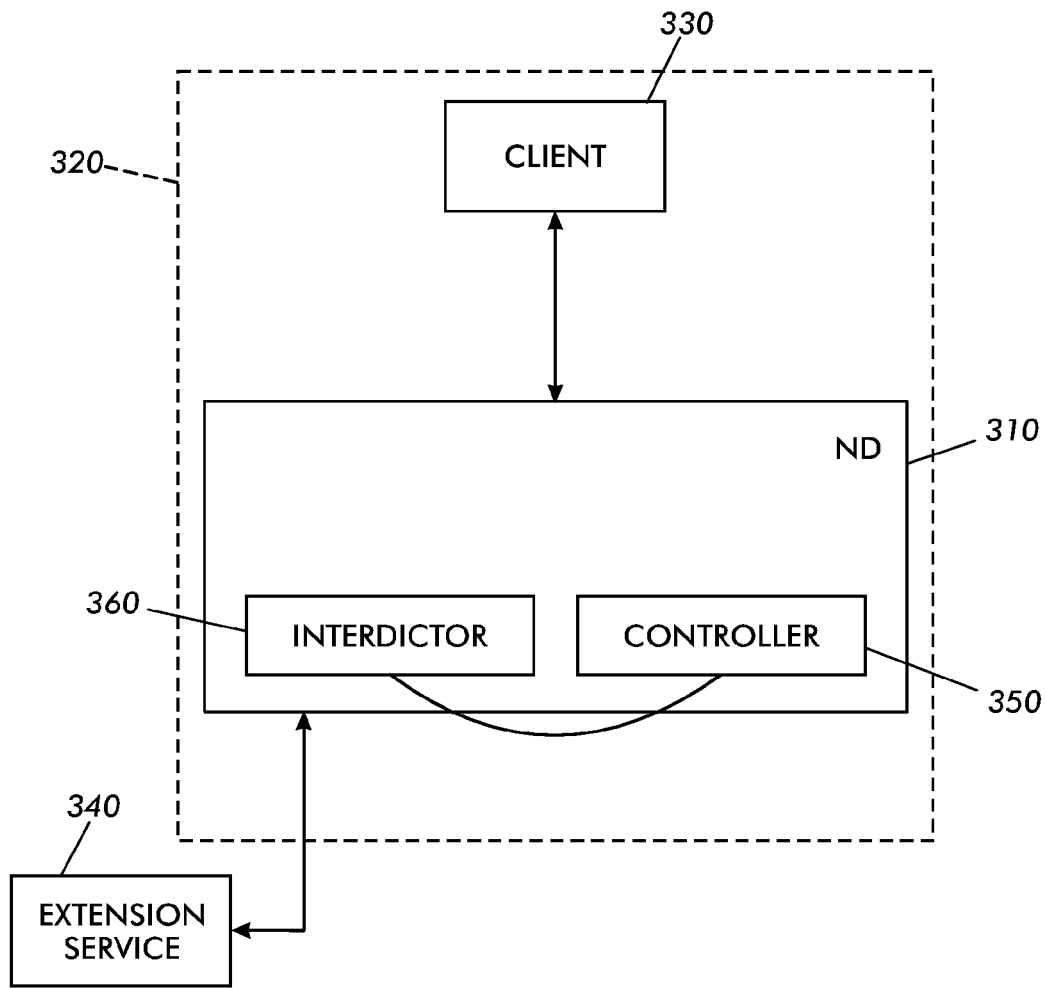
FIG. 3 illustrates a block diagram a network including an apparatus for providing extended functionality to a networked device.

FIG. 3 illustrates an embodiment in which the networked device 310 has included therein a controller 350 and an interdictor 360 as part of the networked device. The client 330 is used when appropriate, but may not be needed such as in the case of clientless scanning and the like. The interdictor 360 can function in the same manner as the interdictor 210. The interdictor 360 could be embodied in a special purpose circuit board, which may be added to the networked device 310, such as being slid into a card slot. In such a configuration, the controller 350 may be part of the special purpose circuit board, or may be a controller of the networked device 310. The interdictor 360 can interact with the client 330 and the extension service 340 in the same manner as described in accordance with the corresponding elements of FIG. 2.

When the interdictor 360 is located within the networked device 310, and has a separate controller 350, it may run outside of the traditional software controller of the networked device 310. The interdictor 360 can bind to external network ports of the networked device 310, and use a network loopback interface to communicate with controller 350. The controller 350 may bind to non-standard network ports, to which the interdictor 360 forwards data from the standard ports. This maintains a clear separation between the interdictor 360 and the controller 350, while allowing interdiction without requiring additional hardware. As an alternative, the interdictor could also be a daemon running on a server (not shown) connected to the network 230, 320.

The extension service 250, 340 may function to construct a self-contained application to add the extended functionality, which may be pushed to and stored at the interdictor 210, 360, where it may be run to modify data as needed. The interdictor 210, 360 can then provide a self-contained execution environment that can modify data, without the need to send it back and forth to the extension service 250, 340, thus providing a gain in efficiency.

The networked device 310 is connected in network 320 to one or more client devices 330 (when used), which may be a print spooler or other client on a server, for example, and alternatively could be a computer used by a user. The extension service may be located outside of the network 320, as shown in FIG. 3 or inside the network 320.

Embodiments may also include computer-readable medium for carrying or having computer-executable instructions or data structures stored thereon. Such computer-readable medium can be any available medium that can be accessed by a general purpose or special purpose computer. By way of example, and not limitation, such computer-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hard-wired, wireless, or combination thereof to a computer, the computer properly views the connection as a computer-readable medium. Thus, any such connection is properly termed a computer-readable medium. Combinations of the above should also be included within the scope of the computer-readable medium.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein. The instructions for carrying out the functionality of the disclosed embodiments may be stored on such a computer-readable medium.

The instructions from a computer-readable medium may be used by an electronic device, such as first electronic device 210, to cause the functionality of the embodiments to occur. These instructions may be loaded into a memory of the first electronic device 210 to be executed by a processor as needed.

Figure 4:
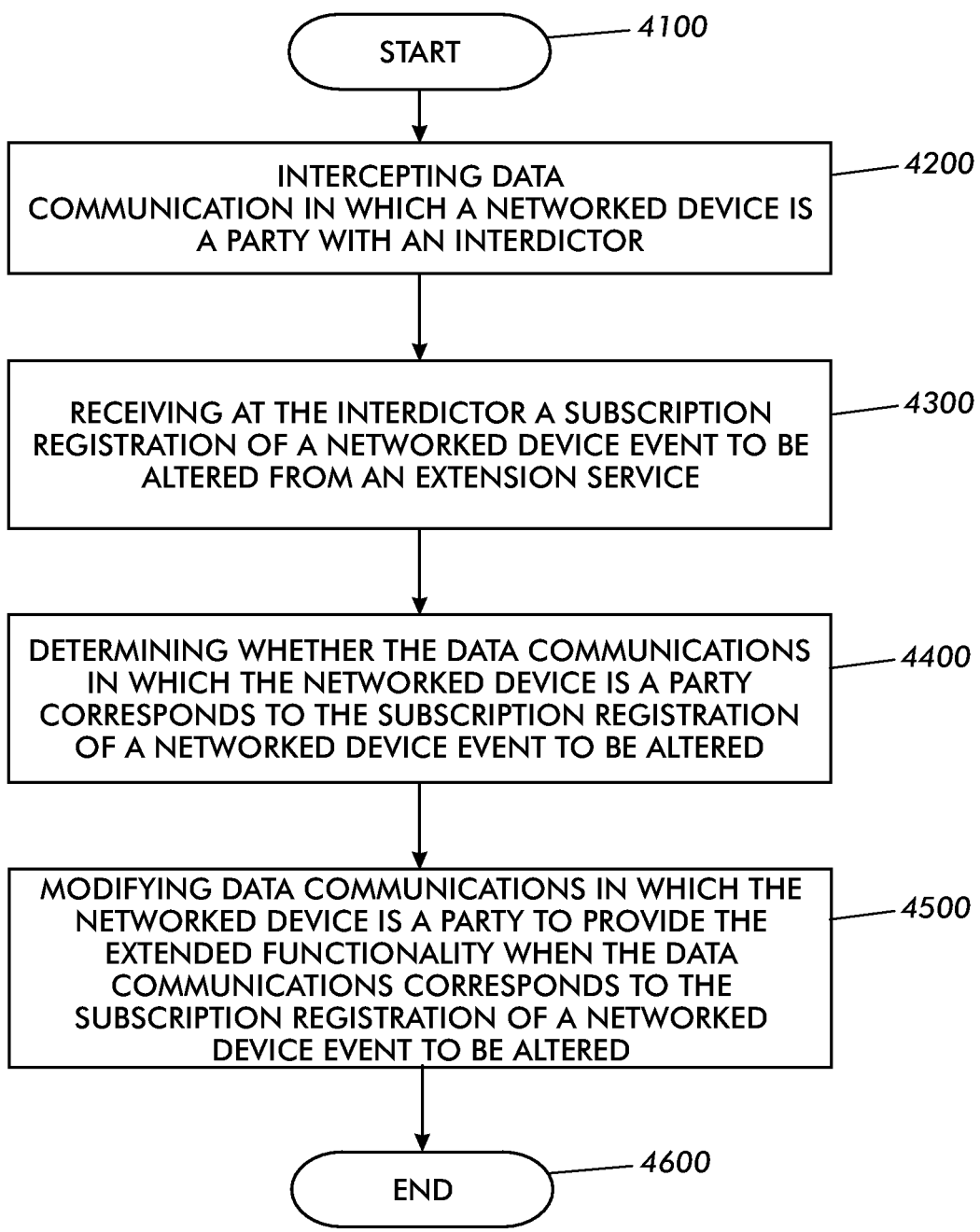
FIG. 4 illustrates a flowchart of a method for providing extended functionality to a networked device.

FIG. 4 illustrates a flowchart of a method for providing extended functionality to a networked device. The method starts at 4100. At 4200, data communications in which a networked device is a party are intercepted with an interdictor. At 4300, a subscription registration of a networked device event to be altered is received at the interdictor from an extension service.

At 4400, it is determined whether data communications in which the networked device is a party correspond to subscription registration of a networked device event to be altered. At 4500, data communications between in which the networked device is a party are modified to provide the extended functionality when it is determined that the data communications in which the networked device is a party corresponds to the subscription registration of a networked device event to be altered. At 4600, the method ends.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of providing extended functionality to a networked device, the networked device connected in a network, comprising:
   intercepting by an interdictor data communications in which the networked device is a party;
   receiving at the interdictor from at least one extension service a subscription registration for notification of a networked device event which is to be altered, wherein the interdictor is located on a remote distinct device from the extension service, wherein an event is an action performed by the networked device or an action to be performed by the network device;
   determining at the interdictor whether the intercepted data communications in which the networked device is a party corresponds to the subscription registration of the networked device event which is to be altered;
   if the interdictor determines that the intercepted data communications corresponds to the subscription registration of the networked device event which is to be altered then notifying the at least one extension service that have subscription registration for notification of a networked device event;
   modifying the intercepted data communications based on a response from the at least one extension service to the notification, wherein the response from the at least one extension service comprises requesting more data from the interdictor;
   wherein modifying the data communication is selected from a group of replacing data in the intercepted data communications, adding data to the intercepted data communications, extending functionality of the networked device;

wherein subscription registration comprises a date and time when the event notification expires;

forwarding at least a portion of the data communications in which the networked device is a party to at least one extension service;

receiving from the at least one extension service a modified version of the at least a portion of the data communication in which the networked device is a party sent to the extension service, thereby performing part of the modification of data communication at the interdictor and part of the modification of data communication at the extension service.

2. The method of claim 1, wherein a response from the at least one extension service is selected from a group of requesting more data from the interdictor, preempt a response to a request, ignore a request from the networked device, modifying the intercepted data communications.

3. The method of claim 2, wherein the subscription registration from the at least one extension service may include additional information such as service name and a synchronous or asynchronous flag.

4. The method of claim 3, wherein the response received from the at least one extension service includes extended functionality data for providing the extended functionality to the networked device.

5. The method of claim 4, further comprising modifying the data communications in which the networked device is a party based on the extended functionality data to provide the extended functionality to the networked device, the modification of the data occurring at the interdictor.

6. The method of claim 1, further comprising receiving from the extension service a modified version of the at least a portion of the intercepted data communications in which the networked device is a party sent to the extension service, and forwarding the modified version of the at least a portion of the intercepted data communications in which the networked device is a party to the networked device to provide the extended functionality, wherein the modified version of the at least a portion of the intercepted data communications in which the networked device is a party includes extended functionality data.

7. The method of claim 5, wherein the networked device is one of a printer, a scanner, a copier, a facsimile device, or a multi-function device.

8. An interdictor for connection in a network to a networked device, and for connection to at least one en extension service, the interdictor providing extended functionality to the networked device, comprising:

a controller residing within the interdictor; and a storage device coupled to the controller, wherein the storage device contains instructions on the controller to:

intercept communications in which the networked device is a party;

receive a subscription registration for notification of a networked device event which is to be altered, the subscription registration being received from the at least one extension service wherein the extension service is contained on a remote distinct device from the interdictor, wherein an event is an action performed by the networked device or an action to be performed by the network device;

determine at the interdictor whether the data communications in which the networked device is a party corresponds to the subscription registration of the networked device event which is to be altered; and if the interdictor determines that the intercepted data communications corresponds to the subscription registration of the networked device event which is to be altered then notify the at least one extension service that have subscription registration for notification of a networked device event, wherein the subscription registration comprises a date and time when the event notification expires;

modify the intercepted data communications based on a response from the at least one extension service to the notification, wherein the response from the at least one extension service comprises requesting more data from the interdictor;

wherein modifying the data communication is selected from a group of replacing data in the intercepted data communications, adding data to the intercepted data communications, extending functionality of the networked device;

forward at least a portion of the data communications in which the networked device is a party to at least one extension service;

receive from the at least one extension service a modified version of the at least a portion of the data communication in which the networked device is a party sent to the extension service, thereby performing part of the modification of data communication at the interdictor and part of the modification of data communication at the extension service.

9. The interdictor of claim 8, wherein subscription registration additionally comprises at least one of number of bytes from a network stream or packet to include in the notification, and an address to send the event notification.

10. The interdictor of claim 9, wherein the controller further receives at the interdictor a response to the event notification, the response being received from the at least one extension service, the response including extended functionality data for providing the extended functionality to the networked device.

11. The interdictor of claim 10, wherein the response from the at least one extension service is selected from a group of preempt a response to a request, ignore a request from the networked device, and modifying the intercepted data communications.

12. The interdictor of claim 9, wherein the controller further causes forwarding at least a portion of the data communications in which the networked device is a party to the at least one extension service.

13. The interdictor according to claim 12, wherein the interdictor receives from the at least one extension service a modified version of the at least a portion of the data communications in which the networked device is a party sent to the extension service, wherein the controller further causes forwarding of the modified version of the at least a portion of the data communications in which the networked device is a party to the networked device to provide the extended functionality, wherein the modified version of the at least a portion of the data communications in which the networked device is a party includes extended functionality data.

14. The interdictor of claim 9, wherein the networked device is one of a printer, a scanner, a copier, a facsimile device, or a multi-function device.

15. A non-transitory computer-readable medium comprising:

a computer-usable data carrier storing instructions, the instructions when executed by a controller residing on an interdictor, said instructions causing the interdictor to:

intercept data communications in which a networked device connected in a network is a party, the data communications being intercepted by the interdictor;

receive at the interdictor a subscription registration of a networked device event which is to be altered to provide extended functionality to the networked device, the subscription registration being received from at least one extension service, wherein the interdictor is located on a remote distinct device from the extension service, wherein the subscription registration comprises an address to send an event notification and a date when the event notification expires; and determining at the interdictor whether the intercepted data communications in which the networked device is a party corresponds to the subscription registration of the networked device event which is to be altered;

if the interdictor determines that the intercepted data communications corresponds to the subscription registration of the networked device event which is to be altered then notifying the at least one extension service that have subscription registration for notification of a networked device event;

modifying the intercepted data communications based on a response from the at least one extension service to the notification, wherein the response from the at least one extension service comprises requesting more data from the interdictor, wherein data communication is modified by performing on the intercepted communication at least one of replacing data, adding data, extending functionality of the networked device;

forwarding at least a portion of the data communications in which the networked device is a party to at least one extension service;

receiving from the at least one extension service an extended version of the at least a portion of the data communication in which the networked device is a party sent to the extension service, thereby performing part of the extension of data communication at the interdictor and part of the extension of data communication at the extension service.

16. The non-transitory computer-readable medium of claim 15, wherein the instructions further cause the controller to forward an event notification to the extension service when it is determined that the data communications in which the networked device is a party correspond to the subscription registration of a networked device event to be altered.

17. The non-transitory computer-readable medium of claim 16, wherein the instructions further cause the controller to modify the data communications in which the networked device is a party based on the extended functionality data to provide the extended functionality to the networked device, the modification of the data occurring at the interdictor.

18. The non-transitory computer-readable medium of claim 16, wherein the interdictor receives from the extension service a modified version of the at least a portion of the data communications in which the networked device is a party sent to the extension service, wherein the instructions further cause the controller to forward the modified version of the at least a portion of the data communications in which the networked device is a party to the networked device to provide the extended functionality, wherein the modified version of the at least a portion of the data communications in which the networked device is a party includes extended functionality data.

* * * * *